// United States Patent [15] 3,668,308
Burt et al. [45] June 6, 1972

[54] A TELEVISION SYSTEM FOR TERRAIN SURVEILLANCE

[72] Inventors: Warren T. Burt; Herman J. Hoffman, both of China Lake, Calif.

[73] Assignee: The United States of America as represented by the Secretary of the Navy

[22] Filed: July 20, 1970

[21] Appl. No.: 56,563

[52] U.S. Cl. ................178/6.6 A, 179/100.2 T, 178/DIG. 20
[51] Int. Cl. .....................H04n 3/32, H04n 5/78, H04n 7/02
[58] Field of Search ...............178/6.6 R, 6.6 A, 6.7 R, 6.7 A, 178/DIG. 20; 179/100.2 T, 100.2 B

[56] References Cited

UNITED STATES PATENTS 2,931,858 4/1960 Hammond et al. ..................178/6.7 R
3,316,348 4/1967 Hufnagel et al. ....................178/6.6 R
3,019,292 1/1962 John....................................178/6.7 R
3,294,902 12/1966 Maxey ...............................178/6.6 A

*Primary Examiner*—Bernard Konick
*Assistant Examiner*—Steven B. Pokotilow
*Attorney*—R. S. Sciascia and Thomas O. Watson, Jr.

[57] ABSTRACT

A system for terrain surveillance from an aircraft utilizing a scanning optical system, a TV monitor, and a modified video recorder. A rotating mirror scans a section of the terrain below the aircraft extending transversely to the aircraft flight path and directs the reflected light onto a photocell. The photocell signal forms the input to the video recorder and TV monitor. The TV display is unconventional in that each frame presented has one new scan added and the lower-most old scan is removed and thus the pilot sees on his monitor a terrain picture which advances as the aircraft moves along its flight path.

13 Claims, 3 Drawing Figures

INVENTORS
WARREN T. BURT
HERMAN HOFFMAN
BY Thomas O. Watson Jr.
ATTORNEY

TELEVISION SYSTEM FOR TERRAIN SURVEILLANCE

STATEMENT OF GOVERNMENT INTEREST

The invention described herein may be manufactured and used by or for the government of the United States of America for governmental purposes without the payment of any royalties thereon or therefor.

BACKGROUND OF THE INVENTION

The present invention relates to systems for terrain surveillance and more particularly to a system for terrain surveillance wherein video information is stored on video tape and simultaneously displayed to the pilot on a TV monitor. In making a pass over a target area, the pilot may replay the video tape and thus examine the video picture under slow motion or stop action.

Prior art devices of a similar nature had many inherent shortcomings in that the terrain scans were recorded on standard film which thus imposed many drawbacks on the ability of instant replay or of pilot monitoring. While some video recorders were employed they too could not meet all of the necessary requirements. The primary method of providing this type system makes use of closed circuit TV. The shortcomings of this approach are listed below.

a. The bandwidth of existing video recorders is not equivalent to that possible in the other equipment in the TV chain. Present recorders have maximum recording frequencies of about 6 megahertz compared to as high as 20 megahertz available with some camera systems. In an airborne TV system, the TV camera takes a picture every fraction of a second (30 pictures per second is normal). The second picture of the series of TV frames has a high percentage of the same information as the first frame; the third, fourth, and so on, also have information which was present in the first frame. The total number of times a specific line of information is present in a picture is a function of the aircraft speed and a viewing angle on the TV system. In recording a TV picture much of the tape is taken up recording the same piece of data, thus making a very poor use of available data storage capacity and extending the frequency response of the recording channel by handling the same data many times.

b. Monitors used to display video pictures are subject to vertical and horizontal sweep instability. This stems from the very narrow frequency limits of the circuitry needed for the magnetic deflection used on the standard TV picture tube.

c. The existing video recorders require precise read head speed to "lock" the picture.

d. Close circuit TV systems are relatively complicated and require highly trained personnel for maintenance.

e. Standard TV display systems utilize high voltages which short out at altitude unless special, expensive, precautions are taken.

f. Video recorders are limited in the amount of other sensor information available.

The system as disclosed by the present invention uses a single line scan technique. A rotating mirror, gyro stabilized in pitch and roll, reflects a sweep of the ground to a collecting optical system with each rotation. The mirror is rotated at a rate portional to the ground speed of the aircraft and the forward motion of the aircraft progresses the scans along the flight path. A cassegrainian optical system is used to focus the reflected sweep onto a photomultiplier cell. This cell is responsive over the visible as well as the near infrared spectral ranges. The signal received from the cell is amplified and passed to a modified video tape recorder which simultaneously records the video signal and provides the pilot's monitor with a real time display.

The pilot's display will be on a standard video monitor. Each successive scan line will be added to the top of the video picture, and one line dropped from the bottom. This will provide a continuous map of the aircraft flight path. At any time the pilot can stop the real time display and replay, stop action, or slow motion any portion of the recorded video picture. This method will provide a nonsmearing, high resolution picture. The resolution in the flight path direction (vertical on the TV monitor) will be achieved by rotating the mirror fast enough to scan one line for every foot of forward movement of the aircraft. The resolution in the cross tract direction (horizontal on the TV monitor) is achieved by use of the appropriate optics and the photomultiplier cell, which has much higher sensitivity than existing TV tubes. The nonsmearing is a result of the high scan rate of the system.

At light levels of $10^{-5}$ to $10^{-6}$ foot lamberts (star light) existing TV systems become photon limited, and no longer provide a readable picture. By use of the cell, which is also infrared sensitive, the scan system would provide an infrared video picture below starlight levels. Should infrared surveillance be required in day light operation, a filter, rotated between the optical system and the cell would provide this ability. An additional feature of the cell over the vidicon is the high dynamic range, from direct sunlight to starlight using infrared. This wide range would provide both daytime and night capability, and would prevent blooming, which can destroy an $L^3$ TV system.

From the above paragraph it is clear that the present invention offers many improvements over prior art systems.

OBJECTS OF THE INVENTION

An object of the present invention is the provision of a ground surveillance system.

Another object of the present invention is the provision of a terrain surveillance system from an aircraft utilizing a scan optical system, a TV monitor, and a modified video recorder.

Still another object of the present invention is the provision of a terrain surveillance system which uses a single line scan technique.

Yet another object of the present invention is the provision of a terrain surveillance system utilizing a scan technique which will provide a continuous map of the aircraft flight path.

Still another object of the present invention is the provision of a terrain surveillance system wherein the pilot may at any time stop the real time display and replay, stop action, or slow motion any portion of the recorded video picture.

Other objects and many of the attendant advantages of this invention will be readily appreciated as the same becomes better understood by reference to the following detailed description when considered in connection with the accompanying drawings in which like reference numerals designate like parts throughout the figures thereof and wherein.

DESCRIPTION OF THE PREFERRED EMBODIMENT

Figure 1:
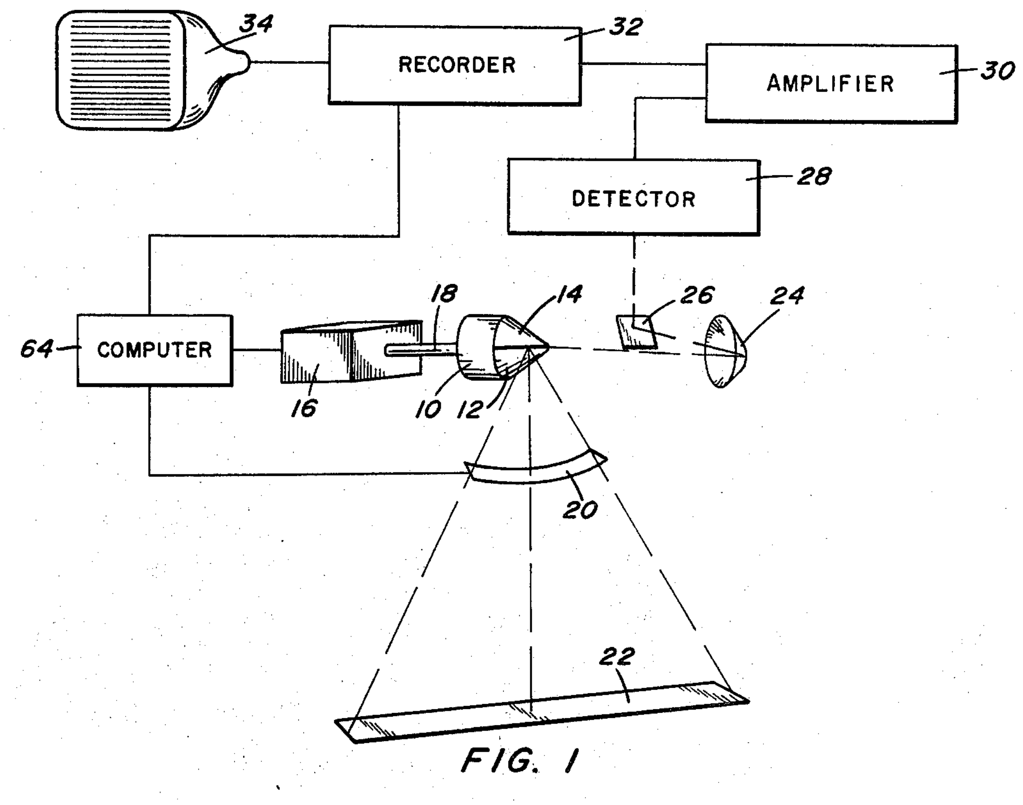
FIG. 1 shows a schematic diagram of the overall system.

Referring now to FIG. 1 which shows an overall schematic view of the entire system there is shown a scanning mirror 10 having a plurality of facets such as 12 and 14, the number of which will be more fully described hereinafter. Scanning mirror 10 is rotated by a gyro system 16 which is controlled by aircraft computer 64 and integrally connected to the mirror by means of a shaft 18. Forming part of the optical system for viewing the ground below the airplane there is an aperture to control the field of view such as 20, the aperture thereby providing a narrow strip of ground as at 22 which is encompassed within each scan of the mirror 10. When an image from the terrain is picked up from the scanning mirror 10 it is then reflected onto a parabolic mirror 24 thence to a folding mirror 26 and on to a detector 28. The output from detector 28 is applied to an amplifier 30, whose amplified signal is then applied to a recorder 32 and in turn to a display device 34.

Figure 2:
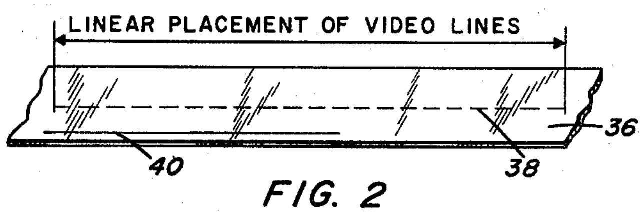
FIG. 2 shows a fragmentary view of the section of the video tape.

In FIG. 2 there can be seen a fragmentary view of the recording tape wherein there is a magnetic tape 36 and having thereon one or more video recording channels and one or more audio channels. Here the video channel is shown at 38 while along the edge of the tape there are audio tracts 40.

Figure 3:
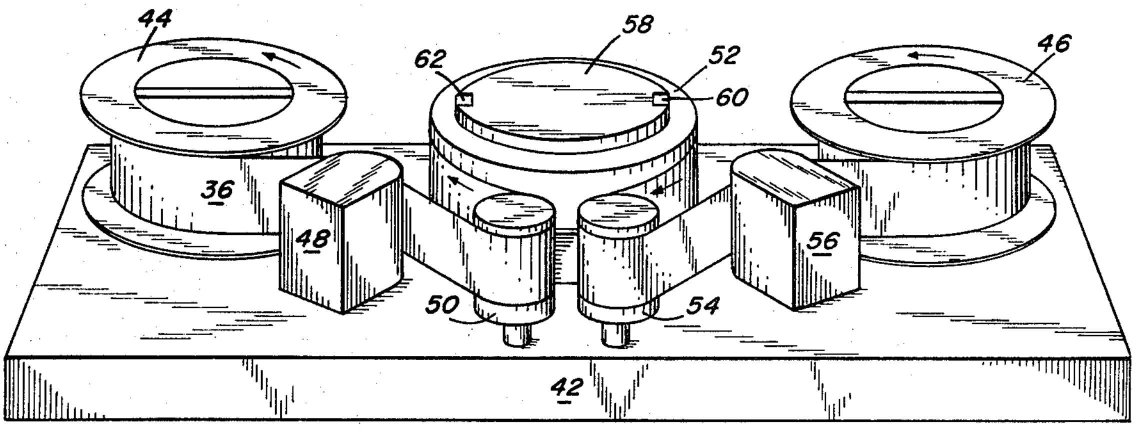
FIG. 3 shows a schematic view of the recording and read out heads on the recorder.

To achieve a video replay for the described invention a new type video recorder had to be developed and it is shown in FIG. 3. There is a tape deck 42 shown having thereon a supply reel 44 and a takeup tape reel 46. The magnetic tape 36 wound around the reels comes off of reel 44 and past a stationary recording head 48 which may be a triple, or quadruple, recording head depending on the required number of channels. After passing recording heads 48 tape 36 moves around a first spindle 50, then around a circular stationary housing 52, then around a second spindle 54 before passing in front of stationary read head 56 and then to takeup reel 46. The video readout will be achieved by two read heads 60 and 62 spaced 108° apart on a rotation disk 58 which revolves within the stationary housing 52.

Turning now to the operation of the invention the rotating mirror 10 and reflective system to be used for scanning is as shown a multisided mirror. The number of reflective surfaces used is a function of the field of view required, perpendicular to the flight path, and the desired speed of mirror rotation. The mirror 10 would be stabilized in pitch and roll by gyro 16 and connecting shaft 18 to provide a narrow and overlaping picture.

To obtain the high resolution desired, the mirror 10 should sweep one line, perpendicular to the flight path, for each foot of forward motion of the aircraft with respect to the ground. If an upper speed limit, for the aircraft, is chosen at a thousand feet per second, then a one sided mirror would have to rotate at a thousand rps maximum. The aircraft navigation computer would be used to provide a signal to control the mirror rotation with respect to aircraft ground speed. Should the aircraft exceed the maximum speed for the mirror, the only effect would be an increase in the ground distance between sweeps (example: at 2,000 ft per second a 2 foot interval would be covered per sweep). To maintain a correct one foot sweep interval for both low level flight and at high altitude, an aperture system as shown at 20 could be used which is slaved to the aircraft altitude. The aperture would be narrowed at altitude, and opened at low levels. This method of scanning provides a high resolution which cannot be obtained with TV systems. An example of the line scan system versus TV would be; at 3,000 feet elevation a TV camera with a depression angle of 20° and the field of view of 30° would scan on the average of only one line for every 500 feet. The line scan system could cover 1 foot per line.

The optical system consisting of rotating mirror 10, parabolic mirror 24, and folding mirror 26 make up a cassegrainian optical system. This system is recommended for the device because the use of a reflective system is desirable in that the light source does not pass through a lens which would reflect infrared radiation.

In detector 28 a photomultiplier cell is incorporated in the circuit since this cell has far greater sensitivity than existing video systems. By the use of an automatic gain control in the amplification system of amplifier 30, the dynamic range of the photomultiplier cell covers the entire range of visible light from $10^4$ foot lamberts (direct sun) to $10^{-6}$ foot lamberts (starlight) and also the infrared region, down to 0.8 microns. This wide range would also remove the danger of blooming, when exposed to bright light, which can destroy an L3 TV camera. Should it become necessary or desirable to use only the infrared mode, for surveillance, under daylight conditions, the use of the filter would provide this ability. Other advantages of this system over TV tubes are, much lower noise level, higher response time, much lower cost, no field maintenance, replaceable, no pilot adjustments required and high operational time before failure.

This video recorder will use a one quarter inch tape, with a one video and two audio channels or a ½ inch tape with two video and two audio channels as the situation may require. The triple or quadruple recording head as 48 will be stationary and will record simultaneously on all channels. While recording, the tape 36 will move pass the stationary recording head 48 at a rate proportional to the rotational speed of the rotating mirror 10. The amplified video signal, as amplified by amplifier 30, will be recorded on the tape as a continuous series of video lines. Simultaneously a real time sync pulse will be recorded on one audio channel, and aircraft navigational coordinates on the other, as shown in audio tracts 40 in FIG. 2. From the record position, tape 36 will then move around spindle 50, around the read drum 52, the second spindle 54 and onto takeup reel 46. The readout will be achieved by two readout heads spaced 180° apart on a rotation disk mounted within the stationary housing 52. The disk, which rotates in the same direction as the tape, will sweep the head past 525 of the record video lines per 180° of rotation. This will require a disk rotational speed of 15 rps to frame a typical video picture. Should the tape be stopped, the heads will still sweep pass 525 lines, but would produce a stop motion picture. nagivational The requirement for projecting 30 frames per second in a TV monitor was originated by the commercial TV industry to simplify home set construction. The integration ability of the human eye can make a stable picture from a projected image rate of 18 frames per second. Basing the read head speed on this frame rate reduces the read head speed to 9 rps.

Vertical sweep of the monitor can be derived from the read head by magnetic pickoffs or, more simply, by concentrically mounted 525 turn potentiometer providing spot displacement for each line regardless of the speed stability of the read head drive.

When the tape is replayed, the real time sync pulse will be used to control the tape speed. This will provide a picture which shows the true aircraft movement with respect to the ground. Should slow motion or stop action be required, the pilot can override the tape speed signal and slow or stop the tape at any position. Also, on the replay condition, the navigational coordinates recorded on the second audio channel, in digital form, can be displayed under the video monitor.

Since the record head will record only one line of video information at a time, the read head will pick up the one new line and preceding 524 lines. In this manner, excessive tape speed is avoided since we will not be required to frame an entire video picture each time. This method would record 1,000 video lines per second when the aircraft is moving at a 1,000 feet per second. The standard video recorders must record 15,750 lines per second.

This method of recording the video information will produce a video picture which shows the new information added to the top of the picture, and the repeated information is moved down the picture. This will provide the pilot with a high resolution video map of the visible or infrared signature of the area covered.

From the above description of the structure and operation of the invention it is clear that the device offers many advantages and improvements over prior arts systems. Thus, the invention discloses an efficient system for terrain surveillance from an aircraft wherein video information is stored on video tape and simultaneously displayed to the pilot on a TV monitor. The recording on the tape and play back is designed so as to form a continuously moving map of the area and at any time the pilot can stop the real time display and replay, stop action, or slow motion any portion of the recorded video picture.

Obviously many modifications and variations of the present invention are possible in the light of the above teachings. It is therefore to be understood, that within the scope of the appended claims, the invention may be practiced otherwise then as specifically described.

What is claimed is:

1. A system for terrain surveillance from an aircraft comprising:

means for scanning an area of terrain and projecting an image of the area;

means for controlling the scanning frequency of said scanning means in response to the ground speed of the aircraft;

photoelectric detector means, disposed so as to receive the projected image, for providing an electrical output signal in response to the image;

visual display means;

a video tape recorder connected between the detector means and the display means, said recorder including:

a. a stationary record head for recording information on the tape in response to the output of the detector;

b. a rotatably mounted disk;

c. a readout head means, mounted on the disk, for reading the information on the tape;

d. variable speed driving means for driving said tape past the record head and the readout head means; and 1 e. means for rotating the disk in the direction of tape movement at a speed which exceeds the speed of the tape by a predetermined amount; and means for varying the speed of the tape driving means in response to the scanning frequency of the scanning means.

2. The system of claim 1 wherein the information is recorded on the tape as a series of individual lines, each line containing the information received from one scan of said scanning means, and the readout head means includes at least one readout head which is swept past sufficient lines to form one video frame for each complete revolution.

3. The system of claim 1 wherein the information is recorded on the tape as a series of individual lines, each line containing the information received from one scan of said scanning means, and the speed of the rotating disk exceeds the speed of the tape driving means by an amount which causes the readout head means to read one new line per frame of the picture on the display means.

4. The system of claim 3 wherein the display means is a TV monitor.

5. The system of claim 4 further including vertical sweep means for the TV monitor whereby each successive scan line will be added to the top of the video picture and one line dropped from the bottom to provide a continuous map of the aircraft flight path.

6. The system of claim 4 wherein the readout head means includes two readout heads mounted on the rotating disk, each head sweeping past 525 of the recorded lines per 180° of rotation of the disk.

7. The system of claim 6 wherein each head is swept past 525 of the recorded lines 15 times per second.

8. The system of claim 1 wherein the scanning mean uses a single line scan technique and includes:

a rotating mirror;

a gyro connected to the rotating mirror to stabilize it in pitch and roll;

an aperture to control the field of view of the rotating mirror, the aperture limiting the field to a single scan oriented transversely to the flight of the aircraft; and an optical system to project an image from the mirror onto the detector.

9. The system of claim 8 wherein said aperture is variable, the size of the aperture being a function of the aircraft altitude.

10. The system of claim 8 wherein the rotating mirror is multisided, the number of reflective surfaces used being a function of the field of view required, and the desired speed of mirror rotation.

11. The system of claim 10 wherein the rotating mirror sweeps one line, perpendicular to the flight path, for each foot of forward motion of the aircraft with respect to the ground.

12. The system of claim 11 wherein the optical system is a reflective system of mirrors without the use of lenses.

13. The system of claim 12 wherein the detector means includes a photomultiplier cell.

* * * * *